US010895760B2

(12) United States Patent
Reynolds

(10) Patent No.: US 10,895,760 B2
(45) Date of Patent: Jan. 19, 2021

(54) HANDS-FREE BINOCULAR DEVICE

(71) Applicant: Brian Reynolds, Redondo Beach, CA (US)

(72) Inventor: Brian Reynolds, Redondo Beach, CA (US)

(*) Notice: Subject to any disclaimer, the term of this patent is extended or adjusted under 35 U.S.C. 154(b) by 40 days.

(21) Appl. No.: 15/373,539

(22) Filed: Dec. 9, 2016

(65) Prior Publication Data
US 2017/0168319 A1 Jun. 15, 2017

Related U.S. Application Data

(60) Provisional application No. 62/265,062, filed on Dec. 9, 2015.

(51) Int. Cl.
G02B 23/18 (2006.01)
G02C 7/08 (2006.01)
G02C 11/00 (2006.01)
H04N 13/344 (2018.01)
H04N 13/239 (2018.01)
G02B 23/12 (2006.01)
G02C 7/14 (2006.01)
H04N 13/296 (2018.01)
G02B 27/01 (2006.01)

(52) U.S. Cl.
CPC ............ G02C 7/088 (2013.01); G02B 23/125 (2013.01); G02B 23/18 (2013.01); G02C 11/10 (2013.01); H04N 13/239 (2018.05); H04N 13/344 (2018.05); G02B 2027/0134 (2013.01); G02B 2027/0138 (2013.01); G02B 2027/0161 (2013.01); G02C 7/14 (2013.01); H04N 13/296 (2018.05); H04N 2213/001 (2013.01); H04N 2213/008 (2013.01)

(58) Field of Classification Search
CPC .. H04N 13/344; H04N 13/239; H04N 13/296; H04N 2213/001; H04N 2213/008; G02B 23/02; G02B 23/18; G02C 11/10; G02C 7/14
USPC .......................................................... 348/53
See application file for complete search history.

(56) References Cited

U.S. PATENT DOCUMENTS 9,767,613 B1* 9/2017 Bedikian ............... G06T 19/006
2015/0234173 A1* 8/2015 Sakata ................... G02B 23/18
359/481
2016/0034032 A1* 2/2016 Jeong ...................... G06F 3/013
345/156
2016/0357016 A1* 12/2016 Cakmakci ................ H04N 5/33
2017/0318235 A1* 11/2017 Schneider .......... G02B 27/2228

* cited by examiner

Primary Examiner — Jae N Noh
(74) Attorney, Agent, or Firm — Hudak, Shunk & Farine Co. LPA

(57) ABSTRACT

A hands-free binocular device. A pair of eyeglasses has two temples. A telescopic section is mounted to each eyeglass temple. The hands-free binocular device includes lenses for magnifying images and light path redirecting devices for controlling the light path to the eyeglass lenses. Light from an image being observed flows through the magnifying lenses and is redirected by the light path redirecting device. The image is magnified and viewable by a user. The user can shift his gaze upward to view the magnified image or look down from the magnified image to view a non-magnified image. In one preferred embodiment the light path redirecting devices are prisms. In another preferred embodiment the light path redirecting devices are mirrors.

15 Claims, 8 Drawing Sheets

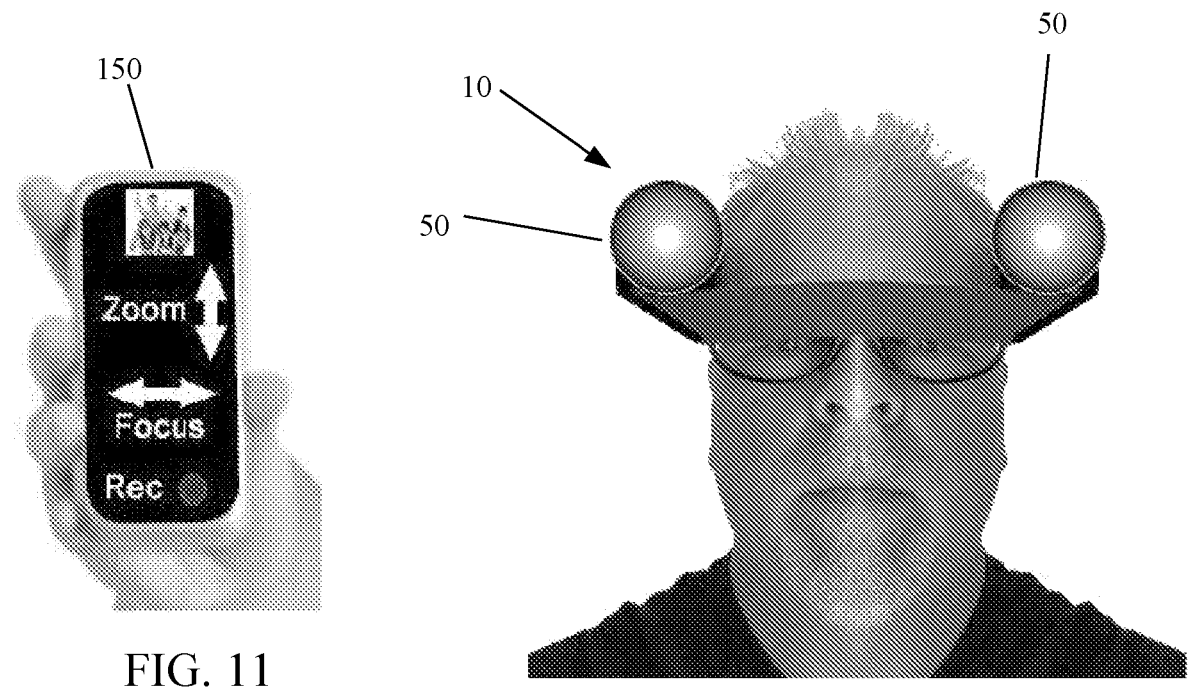
FIG. 11
FIG. 12
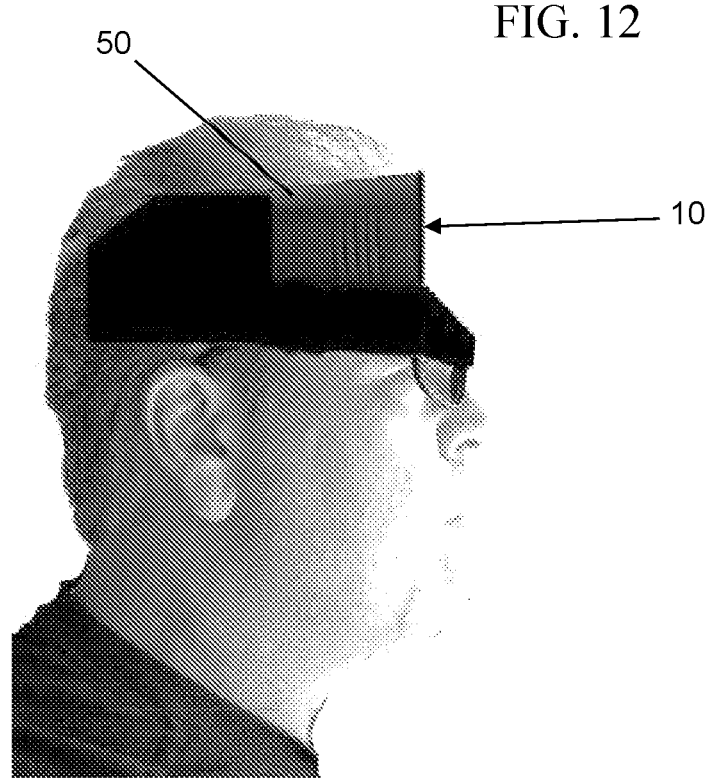
FIG. 13

HANDS-FREE BINOCULAR DEVICE

The present invention relates to binoculars, and in particular, to hands-free binoculars. The present invention claims the benefit of U.S. Ser. No. 62/265,062, filed Dec. 9, 2015, all of which is incorporated by reference herein.

BACKGROUND OF THE INVENTION

Binoculars

Binoculars are well known in the prior art and are also commonly referred to as a pair of binoculars. Binoculars are an optical device that allows the user to see things more clearly that are far away. They are for use with both eyes and included two small telescopes fitted together side by side and a focusing device and usually have magnifying lenses and prisms to increase magnifying ability. However, there are significant problems with prior art binoculars. Namely, binoculars are heavy, cumbersome and difficult to hold steady. Also, binoculars require both hands to operate (FIG. 1).

There have been efforts in the prior art to make a hands-free pair of binoculars. However, prior art attempts at hands-free binoculars attach, or mount a small pair of binoculars in front of the user, making them heavy and uncomfortable to wear (FIGS. 2-4).

What is needed is a hands-free pair of binoculars that are comfortable for a user to wear.

BRIEF DESCRIPTION OF THE DRAWINGS

FIGS. 11-13 show a preferred hands-free binocular device with electronic control.

SUMMARY OF THE INVENTION

The present invention provides a hands-free binocular device. A pair of eyeglasses has two temples. A telescopic section is mounted to each eyeglass temple. The hands-free binocular device includes lenses for magnifying images and light path redirecting devices for controlling the light path to the eyeglass lenses. Light from an image being observed flows through the magnifying lenses and is redirected by the light path redirecting device. The image is magnified and viewable by a user. The user can shift his gaze upward to view the magnified image or look down from the magnified image to view a non-magnified image. In one preferred embodiment the light path redirecting devices are prisms. In another preferred embodiment the light path redirecting devices are mirrors.

DETAILED DESCRIPTION OF THE PREFERRED EMBODIMENTS

Figure 1:
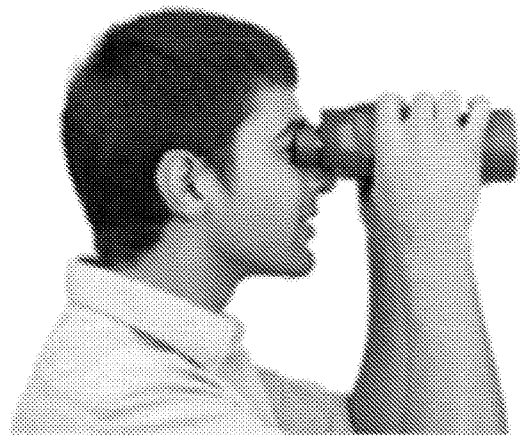
FIGS. 1-4 show prior art binoculars and hands-free binoculars.
Figure 2:
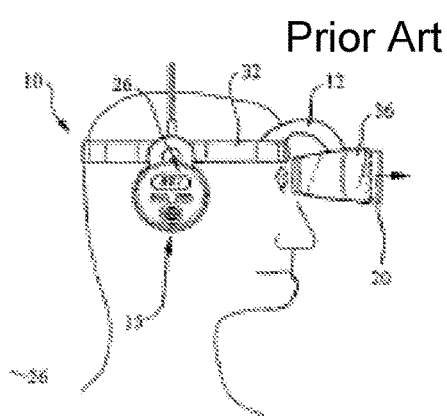
Figure 3:
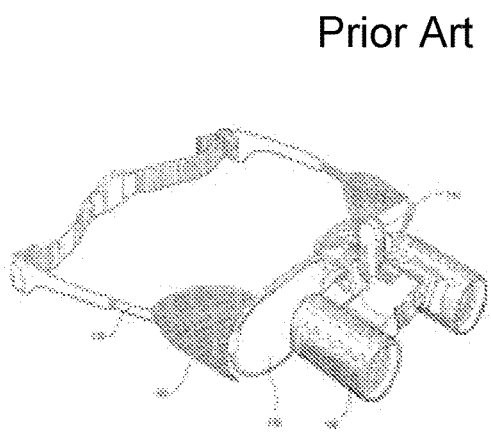
Figure 4:
Figure 5:
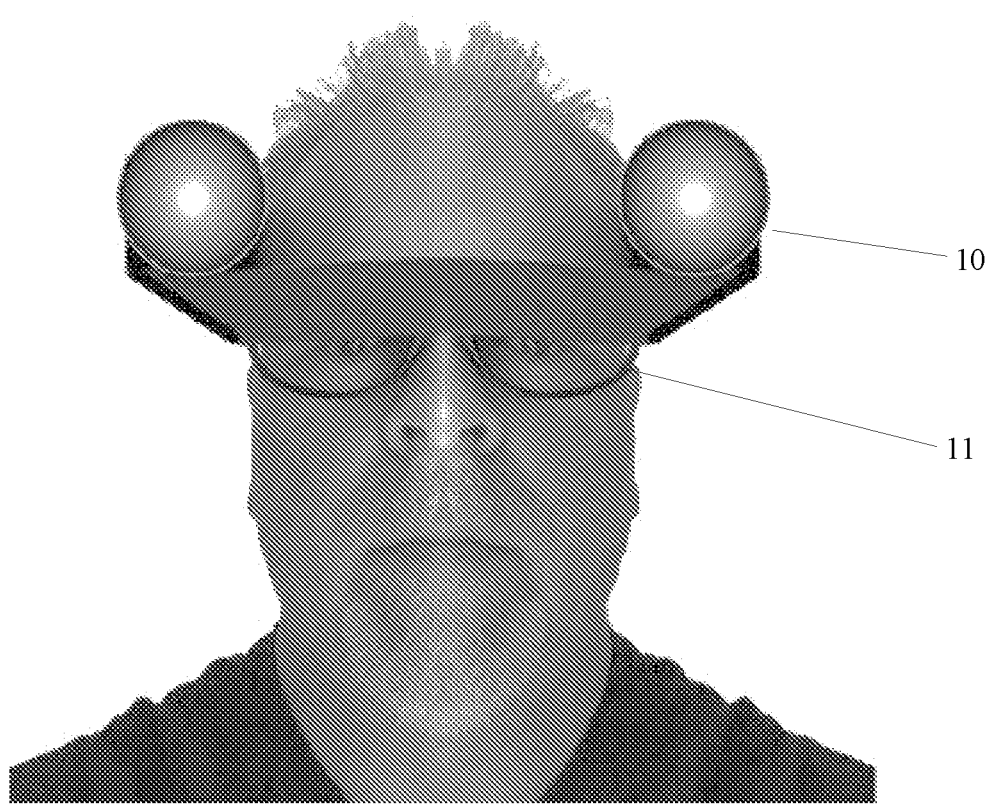
FIGS. 5-6 show a preferred embodiment of the present invention.
Figure 6:
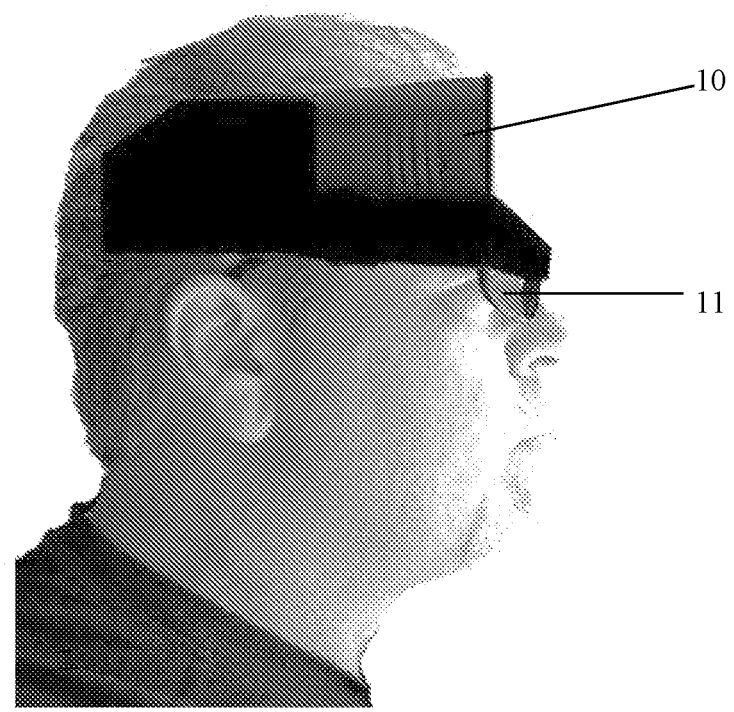

Preferred hands-free binoculars 10 are shown in FIG. 5. A majority of the weight of the binoculars is positioned so that it is comfortably placed on the side of the user's head, as shown (FIGS. 5 and 6). Hands-free binoculars 10 are balanced, lightweight and comfortable. The user may look through eyeglasses 11 directly for non-magnified viewing or he may shift his gaze slightly upward and view the magnified image.

Figure 7:
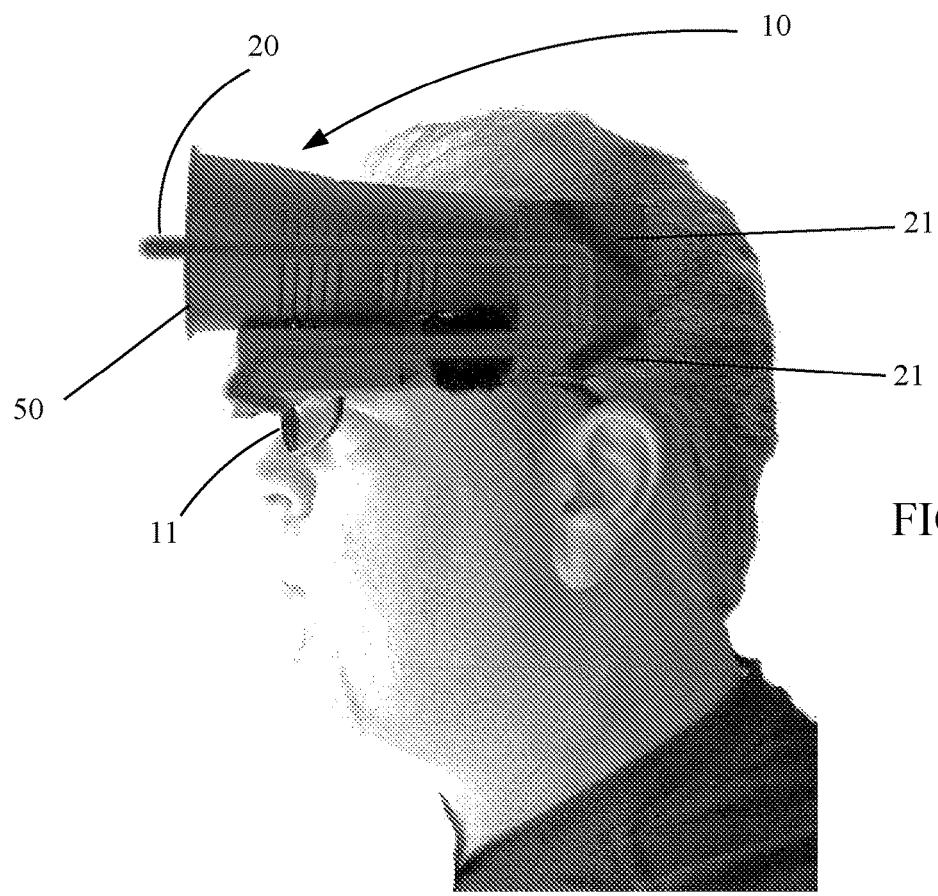
FIGS. 7-8 show a preferred light flow path.
Figure 8:
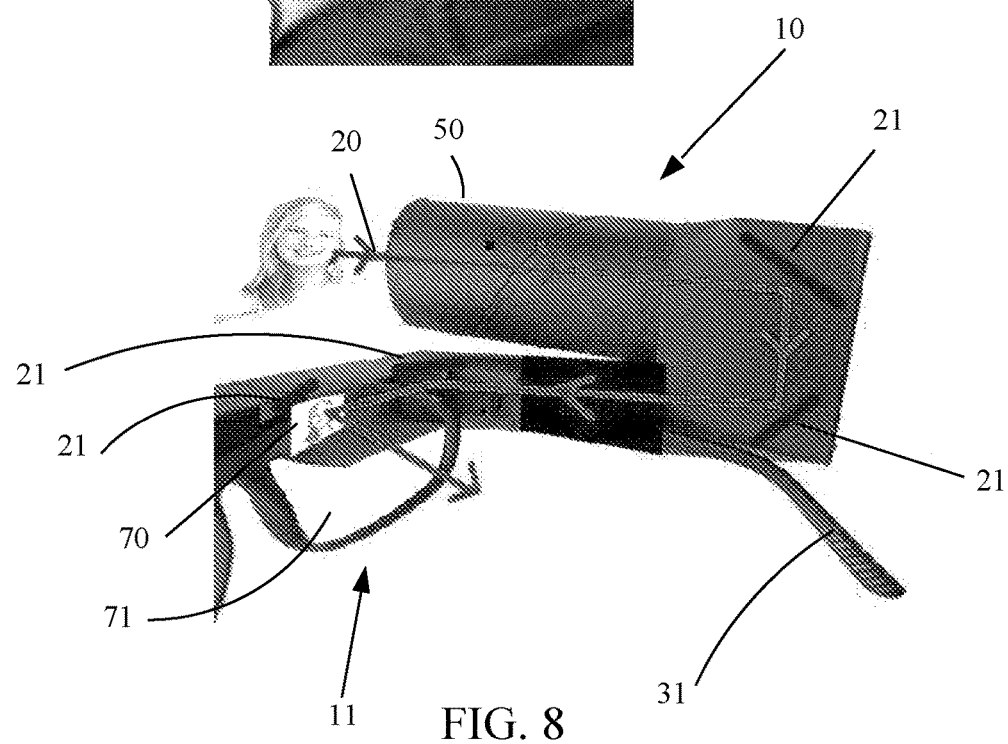

FIGS. 7 and 8 show light flow path 20 through the lenses of the binoculars to the user's eyes. Binoculars 10 include two telescopic sections 50. Each telescopic section 50 is mounted to a temple 31 of eyeglasses 11. Light travels through each telescopic section 50 and is redirected by prisms 21 as shown. The user may then look at the magnified image 70 if he wishes. Or he can look through the normal lenses 71 of eyeglasses 11 if he wishes to view a non-magnified image. In another preferred embodiment, prisms 21 may be replaced with another light path redirecting device. For example in another preferred embodiment, prisms 21 are replaced with mirrors to redirect the light flow path.

Figure 9:
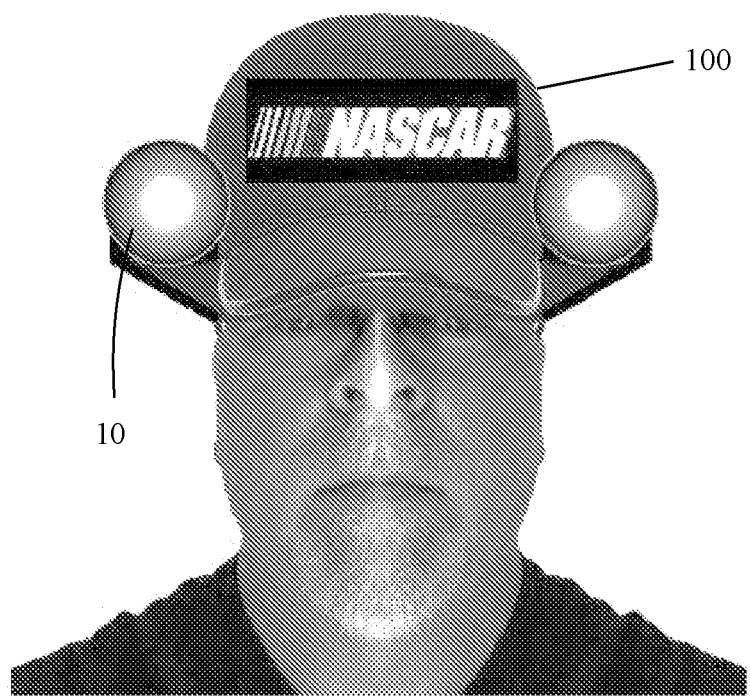
FIGS. 9-10 show the utilization of a preferred hands-free binocular device with a ball cap.
Figure 10:
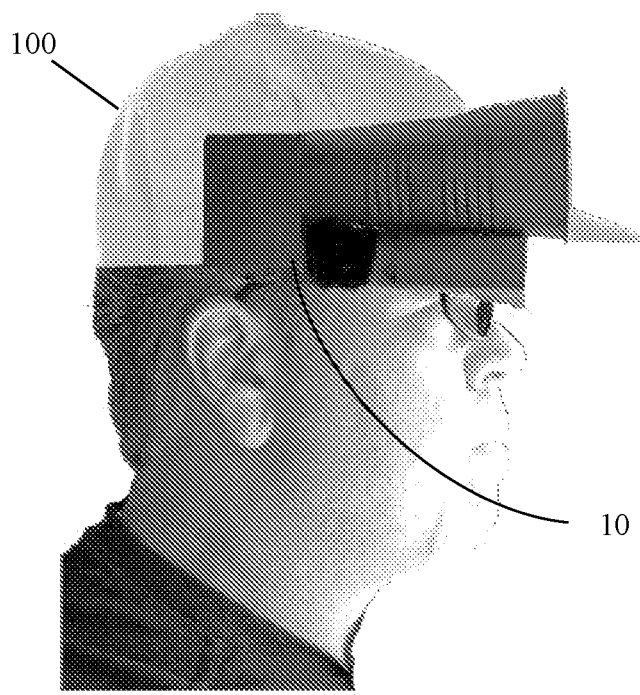

In another preferred embodiment, hands-free binoculars 10 combined with a ball cap, hat or visor. For example, FIGS. 9 and 10 show hands-free binoculars 10 combined with ball cap 100. Also it is possible to include an event or corporate logo, as shown in FIG. 9.

In another preferred embodiment hands-free binoculars 10 includes electronic circuitry and a digital camera (FIGS. 11-13). The electronic circuitry allows for focusing and magnification of hands-free binoculars 10 to be adjusted by utilization of hand held remote 150 and/or a smartphone app. Additionally, hand held remote 150 includes programming to allow for the user to record images he views by manipulating the record button on the remote as shown. The images are recorded and stored onto the database of a digital camera.

Internal Components and Optics

Figure 14:
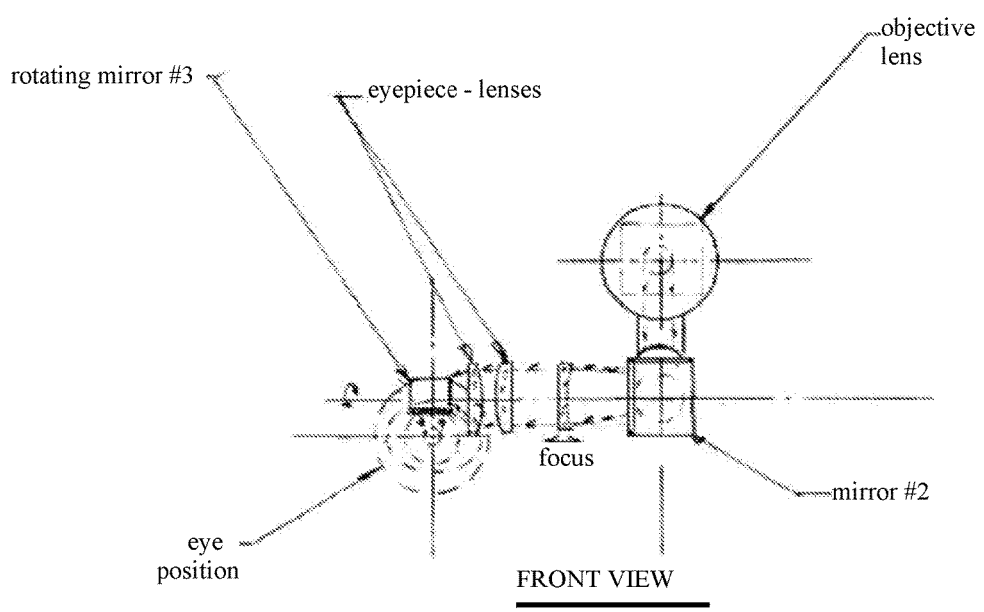
FIGS. 14-16 shows detailed views of the internal components and optics of a preferred hands-free binocular device.
Figure 15:
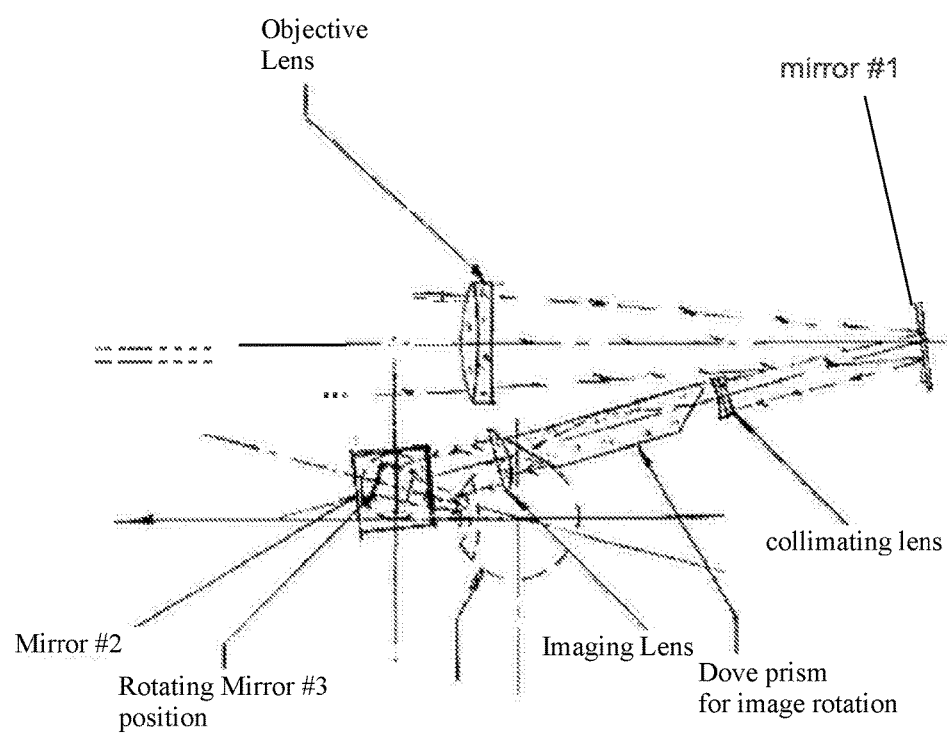
Figure 16:
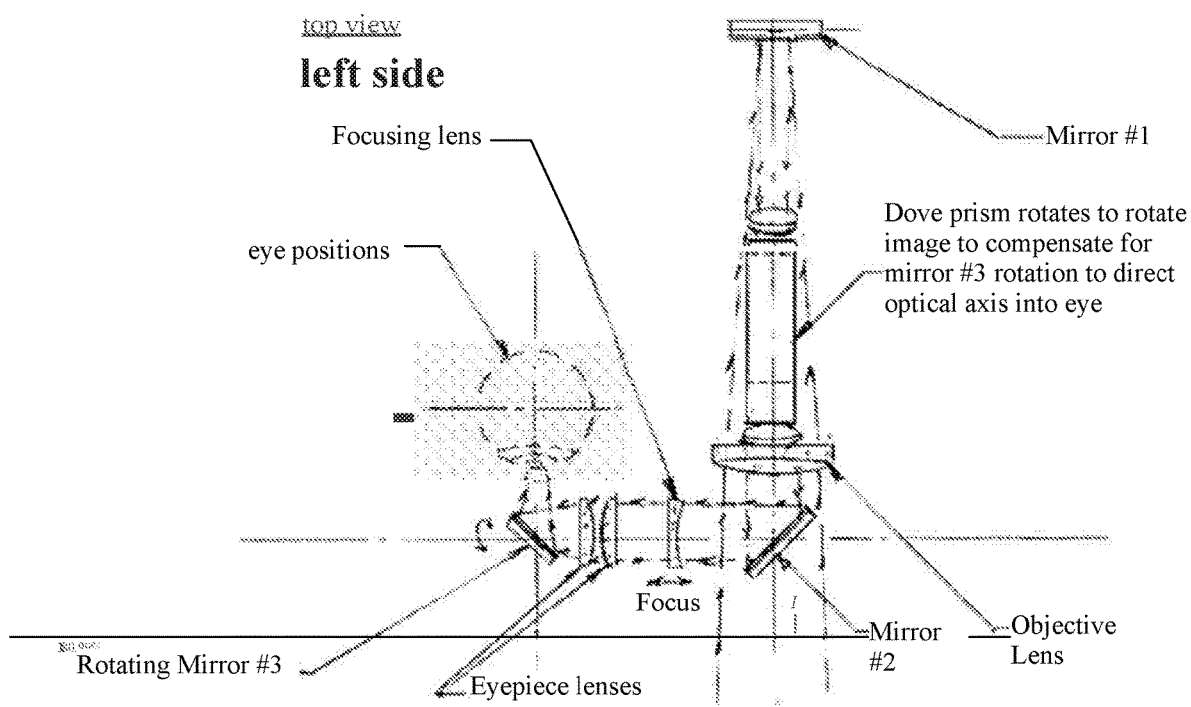

FIGS. 14-16 show a detailed view of the internal components and optics of one preferred embodiment of hands-free binoculars 10. The telescopic sections 50 are mounted onto temples 31 of eyeglasses 11. Lenses and prisms (and/or mirrors) operate in conjunction with each to magnify observed images so that the user can view them by shifting his gaze upward to view magnified image 70. Or optionally the user can shift his gaze downward to look through the normal lenses 71 of eyeglasses 11 if he wishes to view a non-magnified image.

Other Modifications and Embodiments

The above discussion focuses primarily on the utilization of the present invention for hands-free binoculars 10. However, it should be recognized the features of the present invention can be modified and adapted to create other types of hands-free devices. For example, the present invention can be modified to create a hands-free virtual reality display device. Also, the present invention can be modified to create a hands-free magnifier for medical or dental uses, for utilization by a qualified medical or dental practitioner during a medical or dental procedure. Likewise, a hands-free magnifier can be utilized by a chemist or laboratory technician or even it can be utilized for common home use activities such as reading or threading a needle. Also, it should be recognized that the present invention can be modified for video recording so that the images viewed by the user are video recorded, as desired.

Although the above-preferred embodiments have been described with specificity, persons skilled in this art will recognize that many changes to the specific embodiments disclosed above could be made without departing from the spirit of the invention. For example, even though FIG. 12 shows telescopic sections 50 mounted above the eyes of the user, it should be recognized that telescopic sections 50 could be also mounted on temples 31 at the same level as the user's eyes or mounted onto temples 31 below the level of the user's eyes. Also, it should be noted that eyeglasses 11 can include lenses 71 as described above, or eyeglasses 11 can include eyeglass frames without any lenses at all. Or in another preferred embodiment the user can attach his personal eyeglasses to hands-free binoculars 10 for personalized usage. This is desirable for users who have a specific eyeglass prescription and/or a favorite pair of sunglasses. Also, the above preferred embodiments discussed utilization of hand held remote 150. It should be recognized that hand held remote 150 can be replaced with a smartphone having an application that allows the user to easily control the zoom, focus and recording functions in a manner similar to that described above. Therefore, the attached claims and their legal equivalents should determine the scope of the invention.

What is claimed is:

1. A hands-free binocular device, comprising:
   A) a pair of eyeglasses comprising two temples and two lens sections,
   B) two binocular telescopic sections, each said telescopic section removably mounted onto one of said two temples, each telescopic section comprising at least one magnifying lens, wherein each said telescopic section is not a camera,
   C) a plurality of light path redirecting devices connected to each of said two binocular telescopic sections, said plurality of light path redirecting devices for redirecting the path of light as it travels through said two binocular telescopic sections so that an image is projected through said two lens sections,
   wherein light from and image follows a light path that flows through said two binocular telescopic sections, through said at least one magnifying lens, and is redirected by said plurality of light path redirecting devices, and is magnified and viewable by a user who can view said redirected and magnified image as he wishes or shift his gaze and view a non-magnified image.

2. The hands-free binocular device as in claim 1, wherein said plurality of light path redirecting devices comprises at least one prism.

3. The hands-free binocular device as in claim 1, wherein said plurality of light path redirecting devices comprises at least one mirror.

4. The hands-free binocular device as in claim 1, the weight of said hands-free binocular device is placed on the side of a user's head.

5. The hands-free binocular device as in claim 1, wherein the user may look through said eyeglasses directly for a non-magnified image or may look slightly upward for a magnified image.

6. The hands-free binocular device as in claim 1, wherein said hands-free binocular is combined with a ball cap.

7. The hands-free binocular device as in claim 1, wherein said hands-free binocular is combined with a visor.

8. The hands-free binocular device as in claim 1, wherein said hands-free binocular is combined with a hat.

9. The hands-free binocular device as in claim 1, wherein said hands-free binocular includes a corporate logo.

10. The hands-free binocular device as in claim 1, wherein said hands-free binocular further comprises:
    A) electronic circuitry,
    B) a digital camera,
    C) a hand held remote or a smartphone, and
    D) programming,
       wherein said programming allows the user to record images the user views and wherein said images are recorded and stored on the database of said digital camera.

11. The hands-free binocular device as in claim 1, wherein said hands-free binocular device is a virtual reality display device.

12. The hands-free binocular device as in claim 1, wherein said hands-free binocular device is a hands-free magnifier for medical or dental usage.

13. The hands-free binocular device as in claim 1, wherein said hands-free binocular device is a hands-free magnifier for chemist or laboratory technician usage.

14. The hands-free binocular device as in claim 1, wherein said hands-free binocular device is a hands-free magnifier for home usage.

15. The hands-free binocular device as in claim 1, wherein said hands-free binocular device is a video recording device.

* * * * *